US008081491B2

(12) United States Patent
De Geus et al.

(10) Patent No.: US 8,081,491 B2
(45) Date of Patent: Dec. 20, 2011

(54) EXTERNAL NEUTRAL CURRENT SENSOR MATCHED TO A CIRCUIT BREAKER

(76) Inventors: Brent W. De Geus, Iowa City, IA (US); Dennis W. Fleege, Cedar Rapids, IA (US); Randy L. Siebels, Cedar Rapids, IA (US); Salaheddine Faik, Marion, IA (US); Steve A. De Cook, Marion, IA (US); Marcel Montemayor Cavazos, San Nicolas de los Garza (MX); Ignacio Dapic Rodriguez, Escobedo (MX); Ernesto Kim Gomez Bock, San Nicolas de los Garza (MX)

( * ) Notice: Subject to any disclaimer, the term of this patent is extended or adjusted under 35 U.S.C. 154(b) by 358 days.

(21) Appl. No.: 12/507,225

(22) Filed: Jul. 22, 2009

(65) Prior Publication Data

US 2011/0019387 A1 Jan. 27, 2011

(51) Int. Cl.
*H02H 3/00* (2006.01)

(52) U.S. Cl. ............. 361/836; 361/1; 361/837; 324/127

(58) Field of Classification Search ................ 361/1, 30, 361/836, 837; 324/127, 149, 245
See application file for complete search history.

(56) References Cited

U.S. PATENT DOCUMENTS 7,557,563 B2 * 7/2009 Gunn et al. .................. 324/127
7,969,140 B2 * 6/2011 Teppan ......................... 324/127
2009/0174508 A1 * 7/2009 Watford et al. .................. 335/8
2010/0066350 A1 * 3/2010 Matsumura et al. .......... 324/120
2010/0231198 A1 * 9/2010 Bose et al. ................ 324/117 H
2010/0237853 A1 * 9/2010 Bose et al. ................ 324/117 H
2010/0301852 A1 * 12/2010 Teppan et al. ................. 324/253

OTHER PUBLICATIONS

Selected pages from Catalog for PowerPact® M-, P- and R-Frame, and Compact® NS630b-NS3200 Circuit Breakers; (Aug. 2009) (5 pages).
Selected pages from Catalog for Electronic Trip Molded Case Circuit Breakers; (2002) (5 pages).

* cited by examiner

*Primary Examiner* — Dameon Levi

(57) ABSTRACT

A highly accurate current sensing transformer, such as an external neutral current transformer (ENCT), accommodates a wide range of loads. The ENCT includes a housing, first and second terminals each having an end portion extending from and external to the housing, a conductor for carrying a current to be measured, and a current sensor having an aperture for receiving the conductor and having a central axis. The conductor joins the first and second terminals to form a current path that passes through the aperture. Increased accuracy is achieved by arranging the conductor such that a portion thereof passing through the aperture forms a substantial angle relative to the central axis, such that the entry angle of the current path via the conductor through the aperture of the current sensor of the ENCT matches an entry angle of a conductor through an aperture of a current sensor in the electronic trip unit to which the ENCT is attached. Other features resist rotation of the terminals during attachment of the ENCT and allow the ENCT to receive any of a variety of different lugs or terminal nuts, enabling easy attachment.

17 Claims, 12 Drawing Sheets

EXTERNAL NEUTRAL CURRENT SENSOR MATCHED TO A CIRCUIT BREAKER

FIELD OF THE INVENTION

The present invention relates to electrical distribution equipment monitoring and sensing devices, more particularly to current sensing transformers.

BACKGROUND OF THE INVENTION

High voltage electrical equipment, for example industrial electrical equipment, often uses a three phase plus neutral electrical power distribution arrangement. In such an arrangement, the neutral is referred to as an external neutral, because it originates at the equipment being supplied (the load) and is fed back to a distribution panel or the like. Typically, in order to provide ground fault monitoring and protection, a current transformer is used to sense the amount of current flowing in the external neutral. During normal operation, this current should be zero. During fault conditions, this current may be hundreds of amperes.

Known external neutral current transformers (ENCTs) are connected in series with the external neutral and produce a voltage signal indicative of the amount of current flowing through the external neutral. This voltage signal is connected to the trip unit of a circuit breaker supplying electrical power to the load. During an external neutral fault condition, abnormal current in the external neutral is sensed by the ENCT, which applies a voltage signal to the trip unit of the circuit breaker to cause the circuit breaker to open the circuit and discontinue the supply of electrical power to the load.

If an ENCT is highly accurate, it may be used for other applications beside fault protection, including power metering, for example.

BRIEF SUMMARY OF THE INVENTION

An external neutral current transformer or ENCT, is provided that accommodates a wide range of loads and is highly accurate. The ENCT includes a housing, a first terminal having an end portion extending from and external to the housing, a second terminal having an end portion extending from and external to the housing, a conductor for carrying a current to be measured, and a current sensor having an aperture for receiving the conductor, the aperture having a central axis, the conductor joining the first and second terminals to form a current path that passes through the aperture. In one embodiment, increased accuracy is achieved by arranging the conductor such that a portion of the conductor passing through the aperture forms a substantial angle with respect to the central axis of the aperture, such that the entry angle of the current path via the conductor through an aperture of a current sensor of the ENCT matches the entry angle of a conductor through an aperture of a current sensor in the electronic trip unit to which the ENCT is attached. By matching the entry angles of both conductors in the ENCT and in the trip unit, a high degree of current sensing accuracy is achieved. In accordance with a further aspect of the invention, terminals of the ENCT are provided with an interlocking feature that resists rotation of the terminals during installation of the neutral conductor cable into the lugs of the ENCT. The ENCT housing may be provided with jaws configured to receive any of a variety of different lugs or terminal nuts, enabling easy installation of the neutral conductor cable into the ENCT's lugs.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
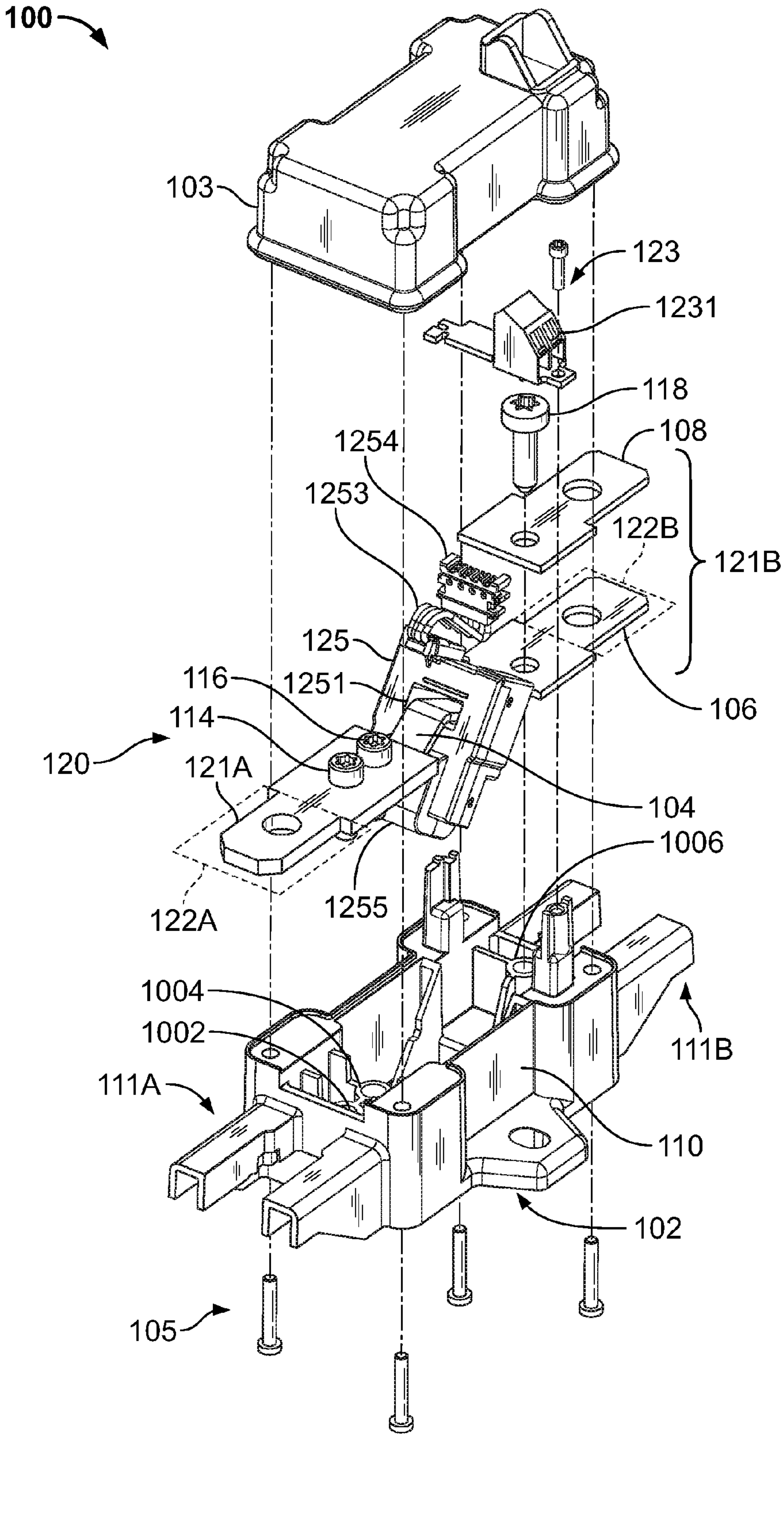
FIG. 1 is an exploded view of a first current transformer or ENCT.
Figure 13:
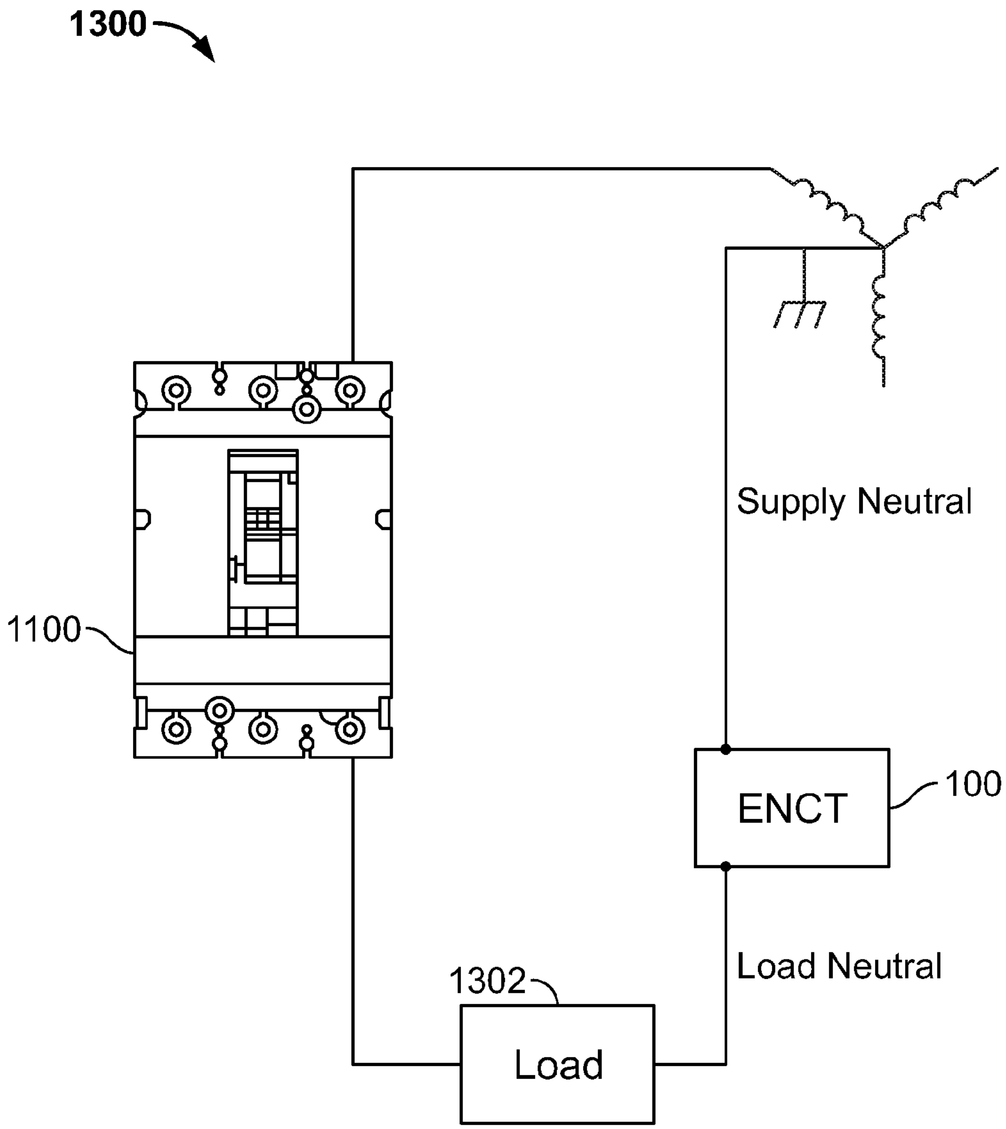
FIG. 13 is a functional block diagram of an ENCT electrically coupled to a circuit breaker having a matched conductor angle through its current sensor as the conductor angle passing through the current sensor of the ENCT.

Referring now to FIG. 1, an exploded view is shown of a first current transformer or ENCT 100 including a base 110, a cover 103, cover screws 105, and a current sensor assembly 120. The base is provided with jaw-like members ("jaws") 111A and 111B that receive lug assemblies or terminal nut assemblies as described more fully hereinafter. The current sensor assembly is provided with corresponding terminals 121A and 121B. Respective portions 122A and 122B of the terminals 121A and 121B extend from and are external to a housing formed by the base 110 and the cover 103. With the current sensor assembly 120 installed in the base 110, the terminals 121A and 121B are suspended above the jaws 111A and 111B. The terminals 121A, 121B are coplanar with one another, and, when installed, lie parallel with a bottom surface 102 of the base 110. To connect the ENCT 100 to external neutral such as shown in FIG. 13, an electrical cable or busbar (not shown) of an external neutral is connected to the terminal 121A using a lug assembly or terminal nut assembly, and another electrical cable or busbar of the external neutral is connected to the terminal 121B using a lug assembly or terminal nut assembly. As a result, the ENCT 100 is electrically connected in series with the external neutral to be monitored. A connector portion 1231 of a circuit board and connector assembly 123 protrudes through the cover 103. Connecting wires (not shown) are run from the connector portion 1231 to an appropriate trip circuit of a trip unit 1102 of a circuit breaker 1100 (shown in FIG. 11). The wires communicate to the trip unit 1102 the voltage output of the current sensor 125. The ENCT 100 shown in FIG. 1 is suitable for use in conjunction with the circuit breaker 1100 (FIG. 11) having a current rating of 15 to 250 A.

Figure 10:
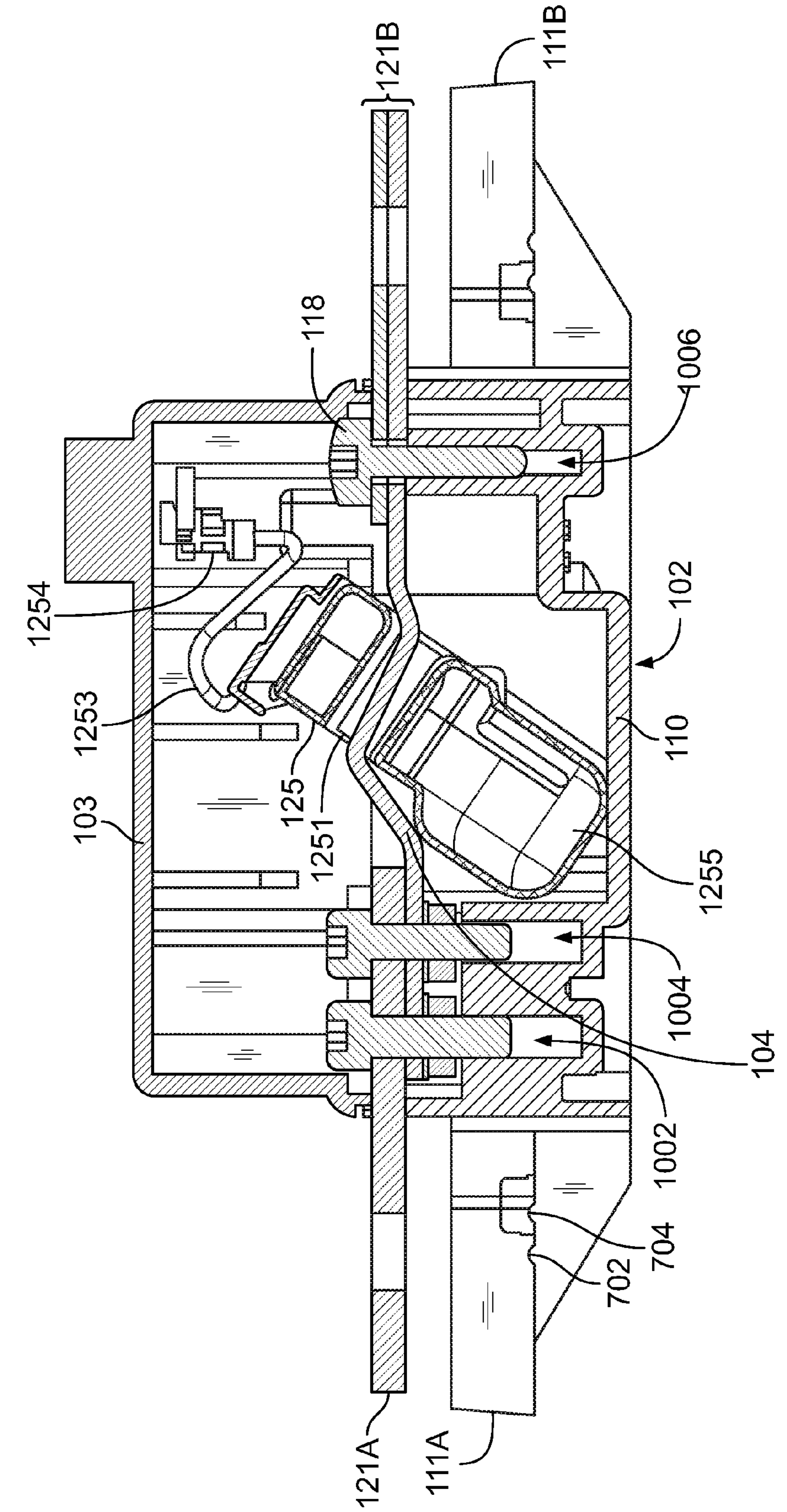
FIG. 10 is a cross-sectional view of an assembled ENCT of FIGS. 1 and 2.
Figure 11:
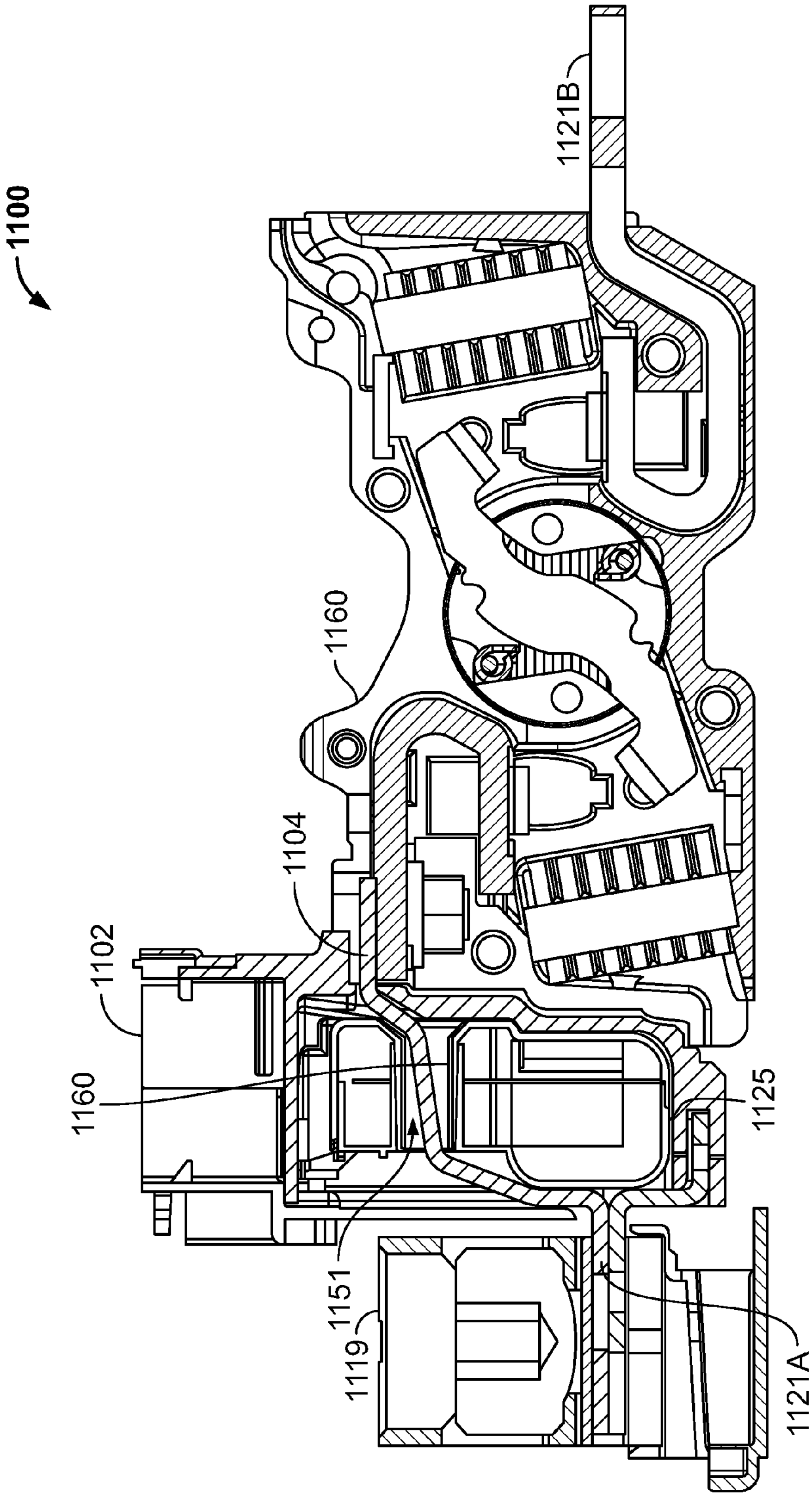
FIG. 11 is a cross-sectional view of a circuit breaker having a current sensor through which a conductor is inserted at the same angle of orientation as that shown in FIG. 1.

In one embodiment, the current sensor assembly 120 uses a current sensor coil 125, duplicating that of a trip unit 1102 of a circuit breaker 1100 (shown in FIG. 11) used with the ENCT 100. In other words, the current sensor assembly 125 of the current sensor assembly 120 is just like the current sensor assembly 1125 used in the circuit breaker 1100. The conductor 1104 carrying a current to be measured by the current sensor 1125 of the trip unit 1102 enters an aperture 1151 of the current sensor 1125 at the same angle that the conductor 104 enters the aperture 1251 of the current sensor 125 of the ENCT 100. The conductors 104, 1104 at the point of entry into the current sensor 125, 1125, respectively, enters the aperture 1251, 1151 proximate to an interior wall 1060, 1160 of the current sensor 125, 1125, respectively. In other words, the conductors 104, 1104 do not enter the corresponding aperture 1251, 1151 at its central midpoint, but rather adjoining the interior wall 1060, 1160 as shown in FIGS. 10 and 11, in the same manner as in the associated trip unit 1102 (FIG. 11). The current sensor 125 is provided with one or more coils that form and surround an aperture 1251 through which a conducting structure (which may include the terminals or be connected to the terminals 121A and 121B) passes. In one embodiment, four Rogowski coils (not shown) are provided and arranged to form and surround the aperture 1251 of the current sensor 125, with each respective coil corresponding to one side of the four sides of the aperture. A wire bundle 1253 and a terminating connector 1254 connect output signals from the respective coils to the circuit board (not shown) and the connector assembly 123.

Without matching the entry angle of the conductor through the current sensors of the ENCT 100 and the trip unit 1102, the output from each of the current sensors would differ slightly, decreasing the accuracy of the readings. This is because the distribution and proximity of the induced magnetic field that hits the Rogowski coils would be slightly different even though the current levels are the same.

In the illustrated embodiment, the current sensor 125 includes a voltage transformer 1255 used in the context of a circuit breaker trip unit but which is not relevant to the present invention. The current sensor 125 is installed into the housing at approximately a 45 degree angle from the bottom surface 102 of the base 110. This angled installation reduces the overall height of the base 110 and the cover 103 compared to an installation in which the current sensor 125 is installed perpendicular to the bottom surface 102.

When the trip unit 1102 compares the currents in the circuit breaker 1100 and the ENCT 100, accuracy of the current reading produced using the current sensor 125 and the circuit board and connector assembly 123 has been found to depend strongly on the relative entry angle of the conducting conductor 104 passing through the aperture 1251. For greater accuracy, it has been found the orientation (e.g., proximity of the conductor 104 to the exterior of the core of the current sensor 125 before entry and/or the angle of entry of the conductor 104 into the current sensor 125) of the conductor 104 passing through the ENCT 100 needs to be similar to the orientation of the conductor in the trip unit 1102. This allows for simpler circuitry in the trip unit 1102 because the trip unit 1102 does not need to compensate for a different current-voltage response from the ENCT 100. The ENCT 100 is essentially matched to the trip unit 1102 of the circuit breaker 1100 that receives the voltage output from the ENCT 100. For ENCTs rated for lower amperage values, the conductor structure may not "fill" the aperture 1251. It has been found in this instance that highly accurate current readings may be achieved by arranging the aperture 1251 and the conductor structure passing through the aperture in a tilted orientation, as opposed to the straight-through orientation, as illustrated in greater detail in FIG. 10. In relation to a central axis of the aperture 1251 of the current sensor, the conductor structure is arranged at a substantial angle, defined herein as an angle in the range of 7 to 70 degrees. An angle within a range of 20 to 45 degrees is more typical. Advantageously, the tilted or angled orientation of the current sensor has also been found to reduce space requirements of the ENCT enclosure. The aperture 1251 has a central axis passing through its center.

As can be seen in FIG. 10, the current sensor 125 is angled relative to the bottom surface 102 at a first angle (e.g., 45 degrees), whereas the conductor 104 is angled relative to the central axis of the aperture 1251 at a second angle that is different from the first angle (e.g., approximately 30 degrees). The conductor 104 is also angled relative to the bottom surface 102 at a third angle that is different from the first and second angles. The conductor 104 terminates at a bridge terminal 106 and is integral therewith. An optional terminal add-on member 108 is placed over the bridge terminal 106 to accommodate a higher current rating.

As illustrated in FIG. 10, the conductor 104 has various bends to allow it to pass through the aperture 1251 to join the two terminals 121A, 121B. One of the bends causes the conductor 104 to extend beyond the plane of the two terminals 121A, 121B before being bent back downward as the conductor 104 passes through the aperture 1251. The first bend angles the conductor 104 closer to the core of the current sensor 125 before the conductor 104 enters the aperture 1251. Terminal screws 114, 116 pass through corresponding holes in the terminal 121A and in the conductor 104. A terminal screw 118 passes through corresponding holes in the terminal add-on member and bridge terminal 106. The ends of the terminal screws 114, 116 are received in bosses 1002, 1004 (shown in FIG. 10) formed in the base 110. The end of the terminal screw 118 is received in a boss 1006 also formed in the base 110. Because the ENCT 100 must withstand relatively high forces (e.g., 34 N-m) when the neutral conductor cable is installed into the lug 819 (FIG. 8) and applies torque to the lug 819. The long, unthreaded screws help to transfer these loading forces from the terminals 121A, 121B to the base 110.

Figure 2:
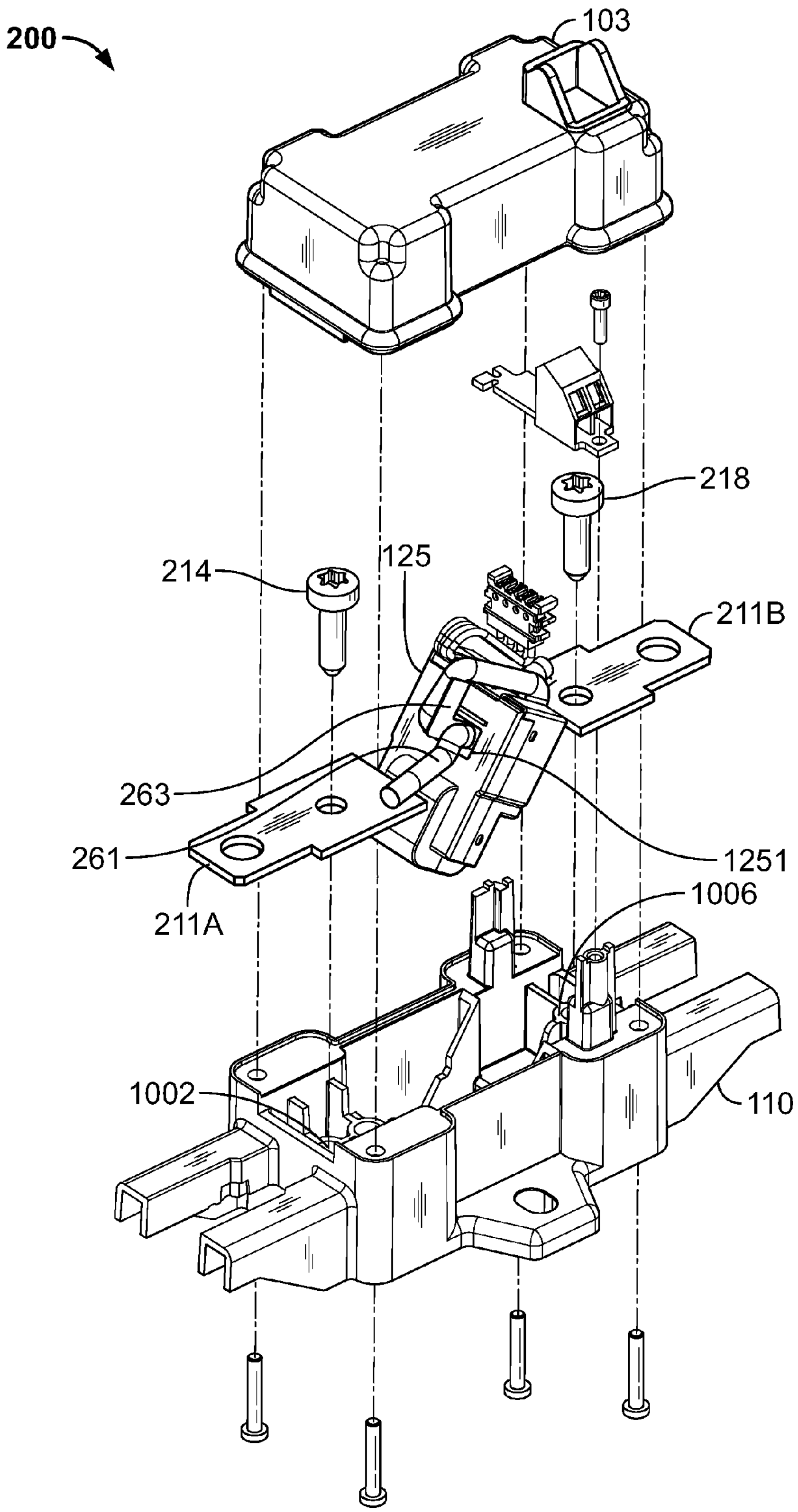
FIG. 2 is an exploded view of a second current transformer or ENCT.

Referring now to FIG. 2, an exploded view is shown of a second current transformer or ENCT 200. The ENCT 200 is designed for a lower amperage (e.g., 60 A or 100 A) than that of the ENCT 100 of FIG. 1. The ENCT 200 may use the same type of current sensor 125 as the ENCT 100. The current sensor 125 is inserted into the base 110 at an angle, like the current sensor 125 shown in FIG. 1. An aspect in which the ENCT 200 of FIG. 2 differs from the ENCT 100 of FIG. 1 is with respect to a conductor structure 104 that passes through the aperture 1251 of the current sensor 125. In the embodiment of FIG. 2, the conductor structure 261 is formed by a shaped or flexible conductor 261 that is connected at opposite ends to terminals 221A and 221B, which are coplanar with one another. An intermediate portion of the conductor 261 extends into or through a first side of the aperture 1251, exits a second side and is bent outside of the aperture 1251 to reverse course, passes back through the first side of the aperture, and exits out of the second side of the aperture 1251. As a result, the conductor 261 effectively passes through the aperture 1251 twice, forming a looped member to amplify the voltage output from the conductor 261 for lower current-rated breakers. An insulating fiber member 263 is placed between portions of the conductor 261 in the area of the aperture 1251, insulating those portions from one another.

Terminal screws 214, 218 anchor the terminals 211A, 211B, respectively, to the base 110. The end of the terminal screw 214 is received in the boss 1002 formed in the base 110. The end of the terminal screw 218 is received in a boss 1006 also formed in the base 110.

Figure 3:
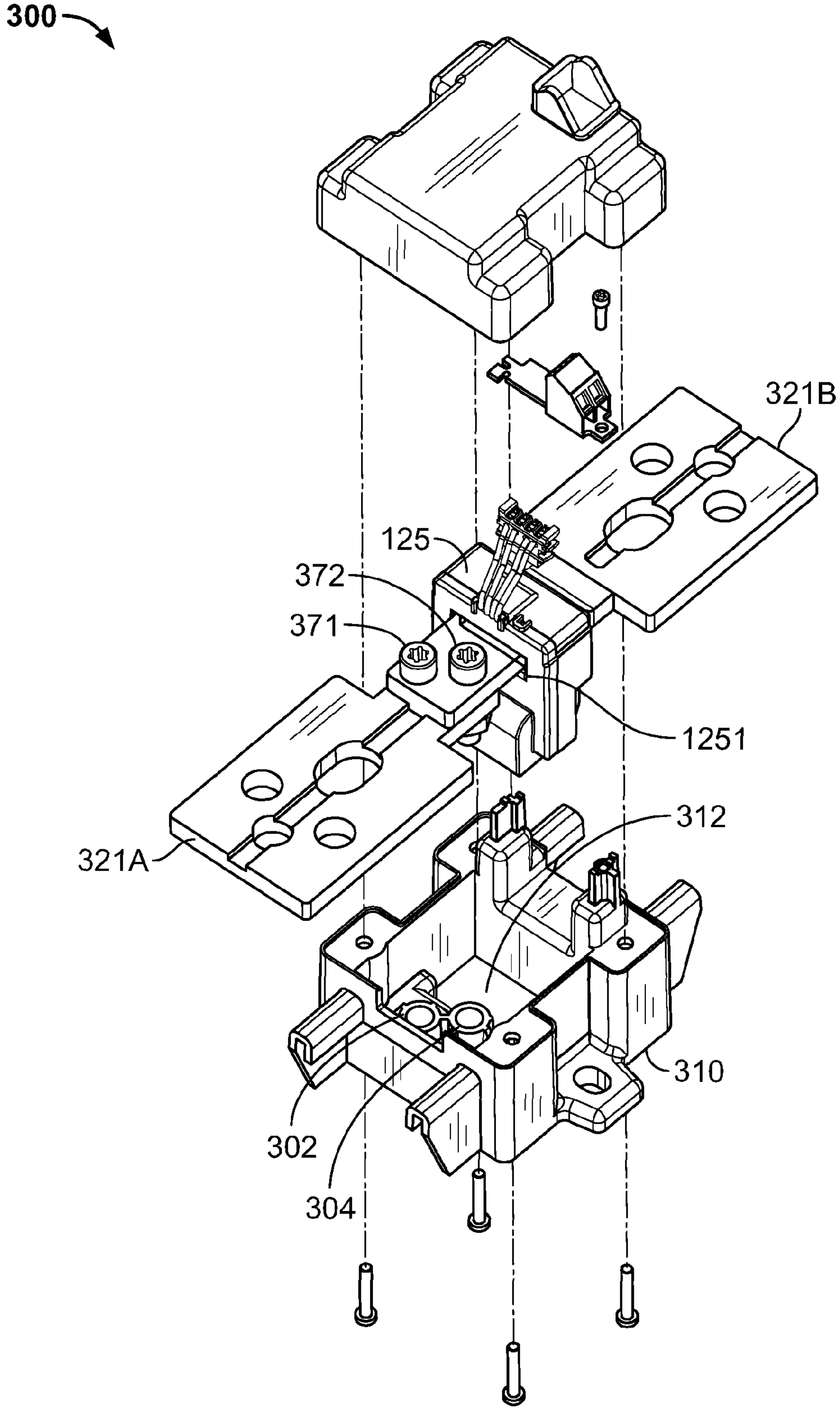
FIG. 3 is an exploded view of a third current transformer or ENCT.

Referring now to FIG. 3, an exploded view is shown of a third current transformer or ENCT 300. The ENCT 300 has a slightly different base 310 compared to the base 110 shown in FIGS. 1 and 2. The base 310 includes two bosses 302, 304 for receiving terminal screws 371, 372. The ENCT 300 is designed for a higher amperage (e.g., 600 A) than the ENCT 100 of FIG. 1 or ENCT 200 of FIG. 2. The ENCT 300 may use the same type of current sensor 125 as that of the ENCT 100. Unlike the current sensor 125 shown in FIGS. 1 and 2, the current sensor 125 of FIG. 3 is inserted in a perpendicular orientation into the base 310. An aspect in which the ENCT 300 of FIG. 3 differs from the ENCT 100 of FIG. 1 and the ENCT 200 of FIG. 2, is with respect to a conductor structure that passes through the aperture 1251 of the current sensor 125. In the embodiment of FIG. 3, the conductor structure is formed by and is integral to the terminals 321A and 321B. The terminals 321A and 321B are connected by bridge terminal screws, such as screws 371 and 372, the free ends of which are received in corresponding bosses 302, 304 formed in the base 310 but do not thread into the base 310 for ease of installation.

The terminals 321A and 321B of FIG. 3 are larger than the terminals 121A and 121B of FIG. 1 and fill the aperture 1251 more completely. Accordingly, the terminals 321A and 321B form a conductor structure that passes through the aperture 1251 in a straight-through orientation as compared to the tilted orientation of FIG. 1 and FIG. 10. In other words, the bridge terminal 321A and terminal 321B are parallel to a bottom surface 312 of the base 310 when installed onto the base 310. The current sensor 125 is oriented perpendicular to the bottom surface 312 of the base 310, meaning that the closed-loop core of the current sensor 125 and its corresponding aperture are perpendicular to the bottom surface. The entry angle of the conductor 104 through the current sensor 125 in the ENCT 100 thus matches the entry angle of a corresponding conductor through a current sensor in a trip unit 1102 of the corresponding circuit breaker 1100 (FIG. 11), resulting in a higher degree of current sensing accuracy because the outputs of both current sensors are matched due to the matched orientations of the conductors in the current sensors.

Figure 4:
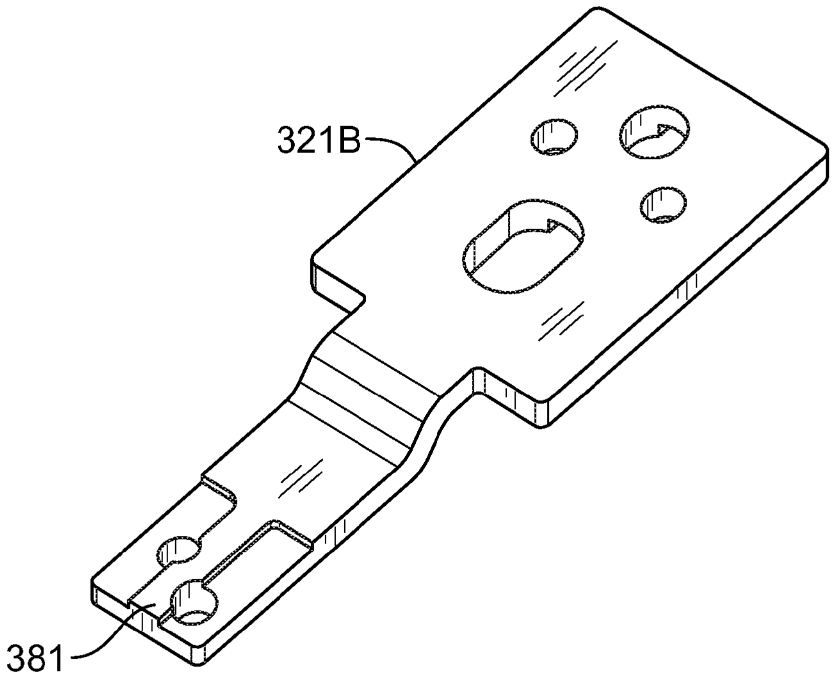
FIG. 4 is a more detailed view of a terminal of the ENCT of FIG. 3.
Figure 5:
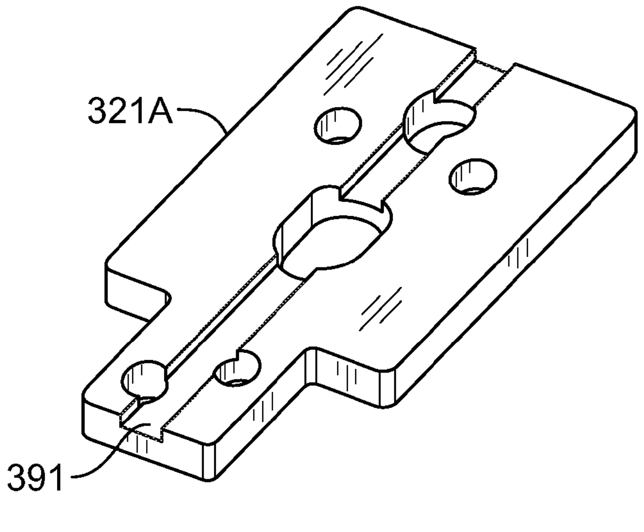
FIG. 5 is a more detailed view of another terminal of the ENCT of FIG. 3.
Figure 6:
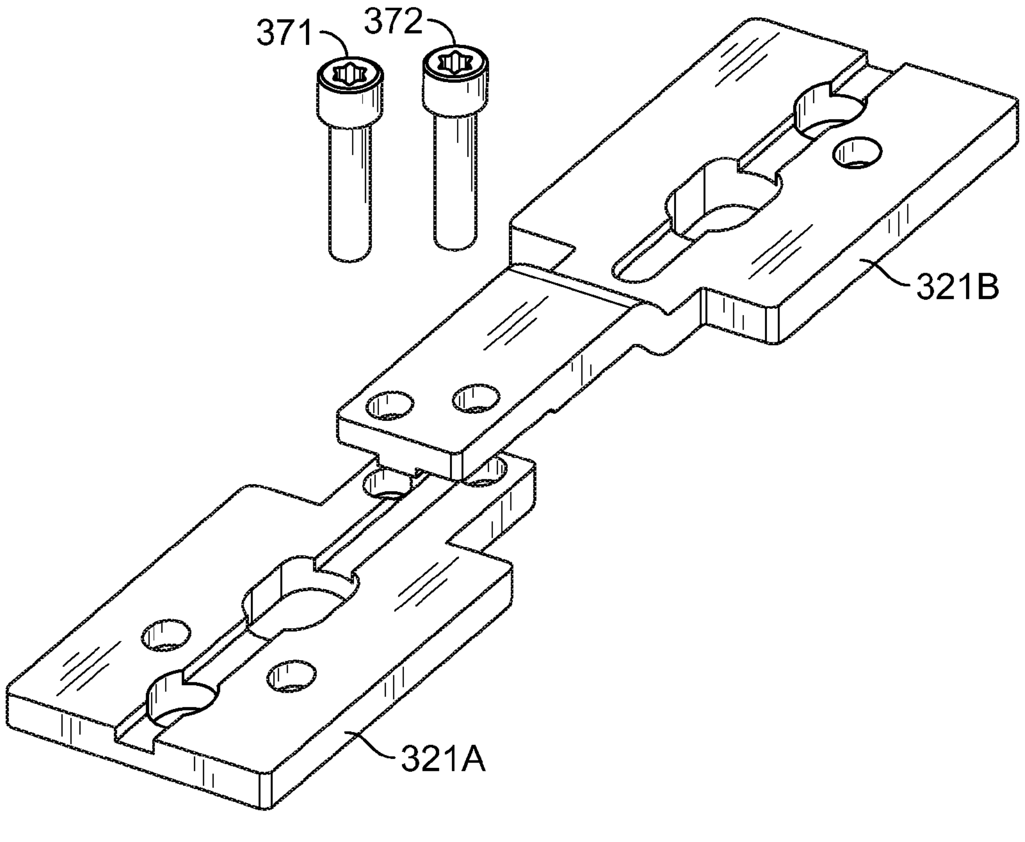
FIG. 6 is a more detailed view illustrating interlocking of the terminals of FIGS. 4 and 5.

The terminals 321B and 321A are shown in greater detail in FIG. 4 and FIG. 5, respectively. The terminal 321A (FIG. 5) may be provided with a channel or groove 391 that forms a first interlocking member. For ease of assembly, the channel 391 may have angled sidewalls. The sidewalls may have a positive angle of 45 degrees, for example, relative to the bottom of the channel 391. As seen in FIG. 4, the terminal 321B may be provided with a matching tongue 381 having sidewalls at a matching angle to form a second interlocking member. An exploded view of the joined terminals 321A and 321B and the terminal screws 371 and 372 is shown in FIG. 6. When the terminals 321A and 321B are bolted together as shown, the interlocking features of the channel 391 and the tongue 381 interlock, resulting in a conductor structure more capable of resisting rotational forces applied to the terminals 321A and 321B through lug assemblies or terminal nut assemblies during installation while still maintaining a low resistance current carrying joint.

Figure 7A:
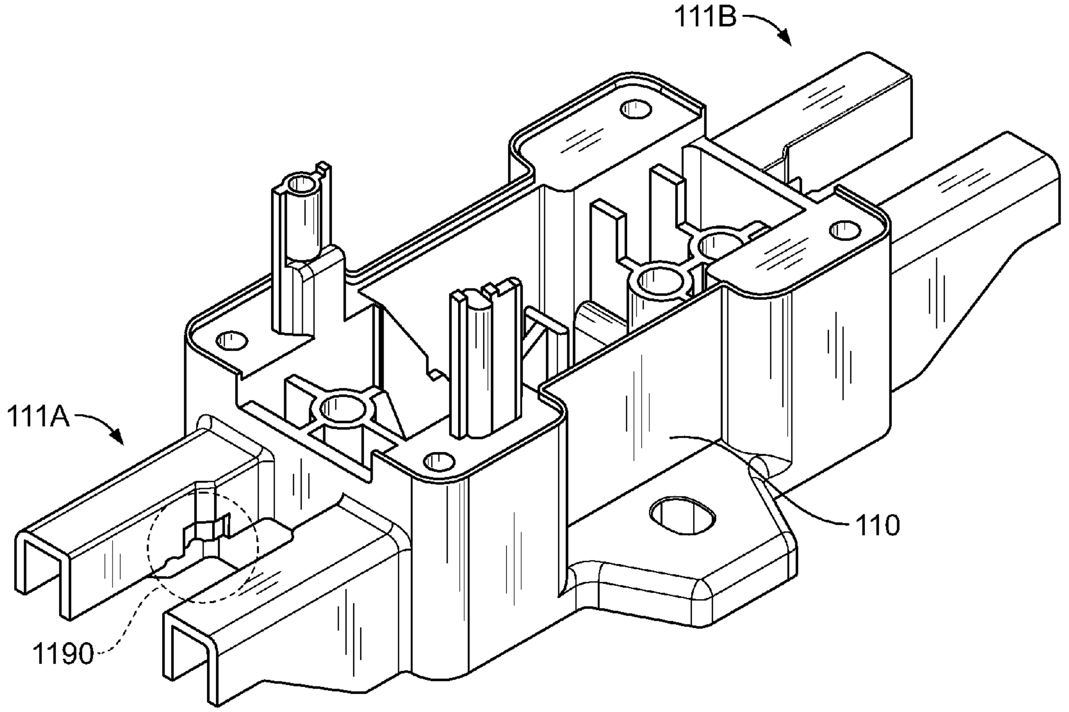
FIG. 7A is a more detailed view of a base of the ENCT of FIG. 1 and FIG. 2.
Figure 7B:
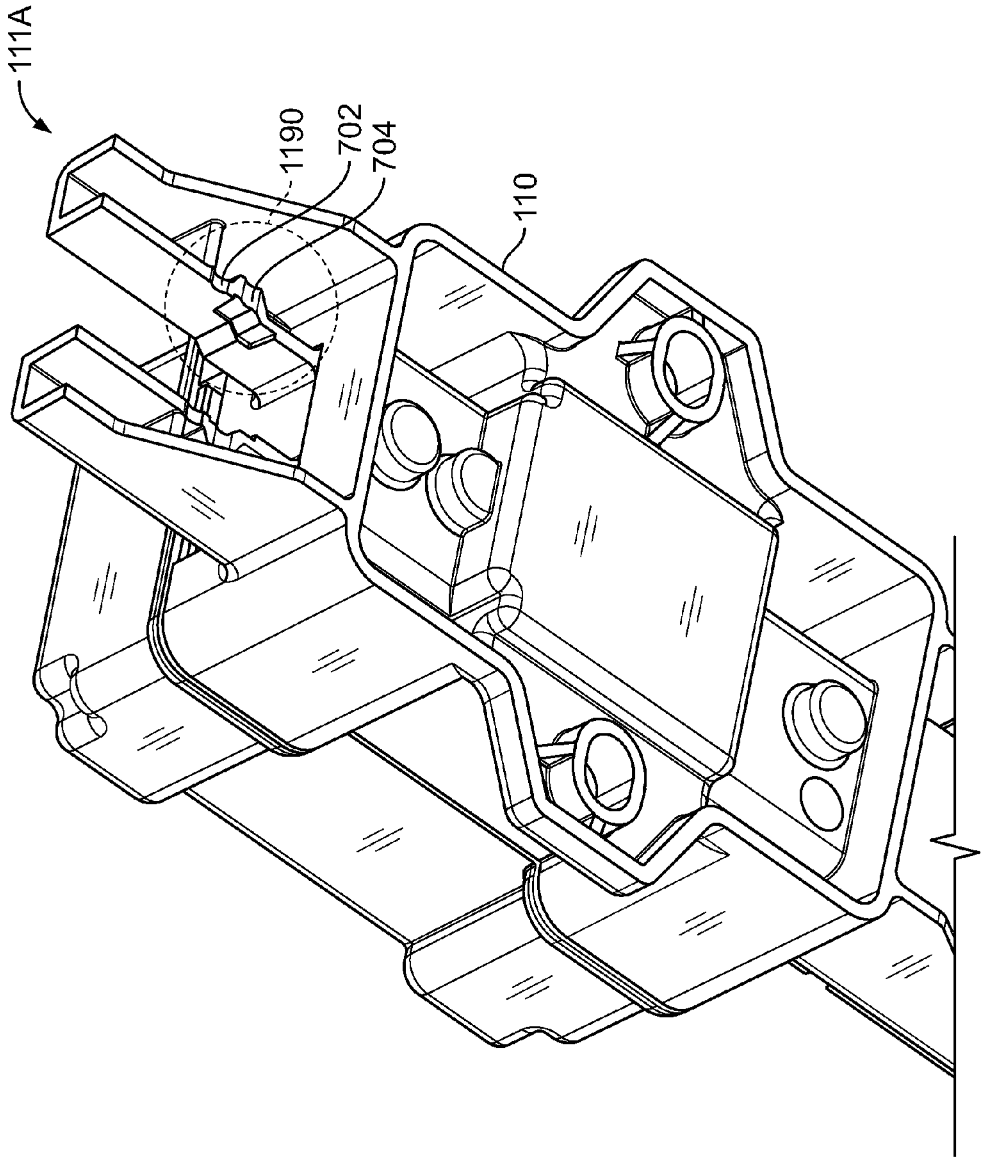
FIG. 7B is a bottom perspective view of the base of the ENCT revealing recessed detent features on a bottom surface of one of the jaws.
Figure 8:
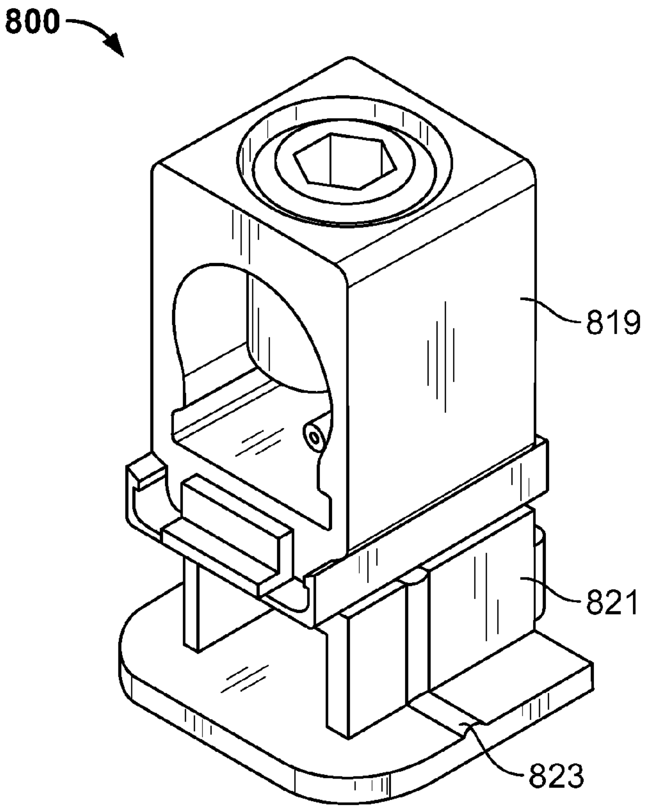
FIG. 8 is a perspective view of one style of lug for which the base of FIG. 7 provides snap-in engagement.
Figure 9:
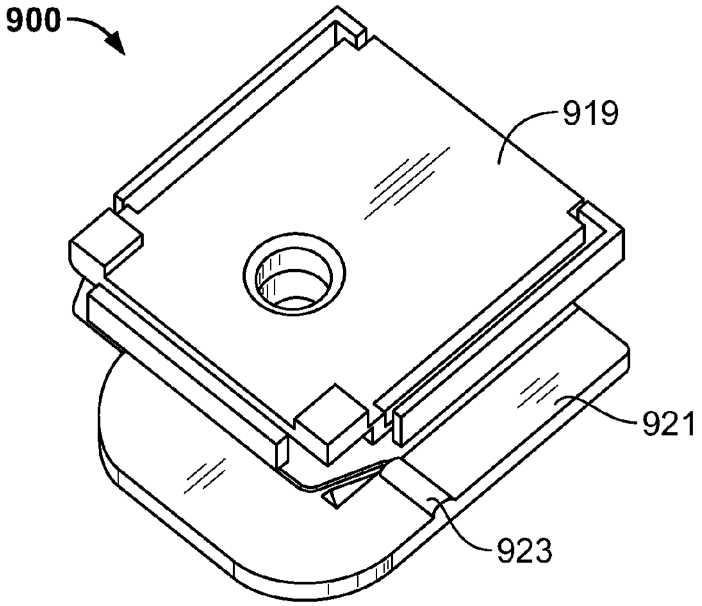
FIG. 9 is a perspective view of one style of terminal nut for which the base of FIG. 7 provides snap-in engagement.
Figure 12:
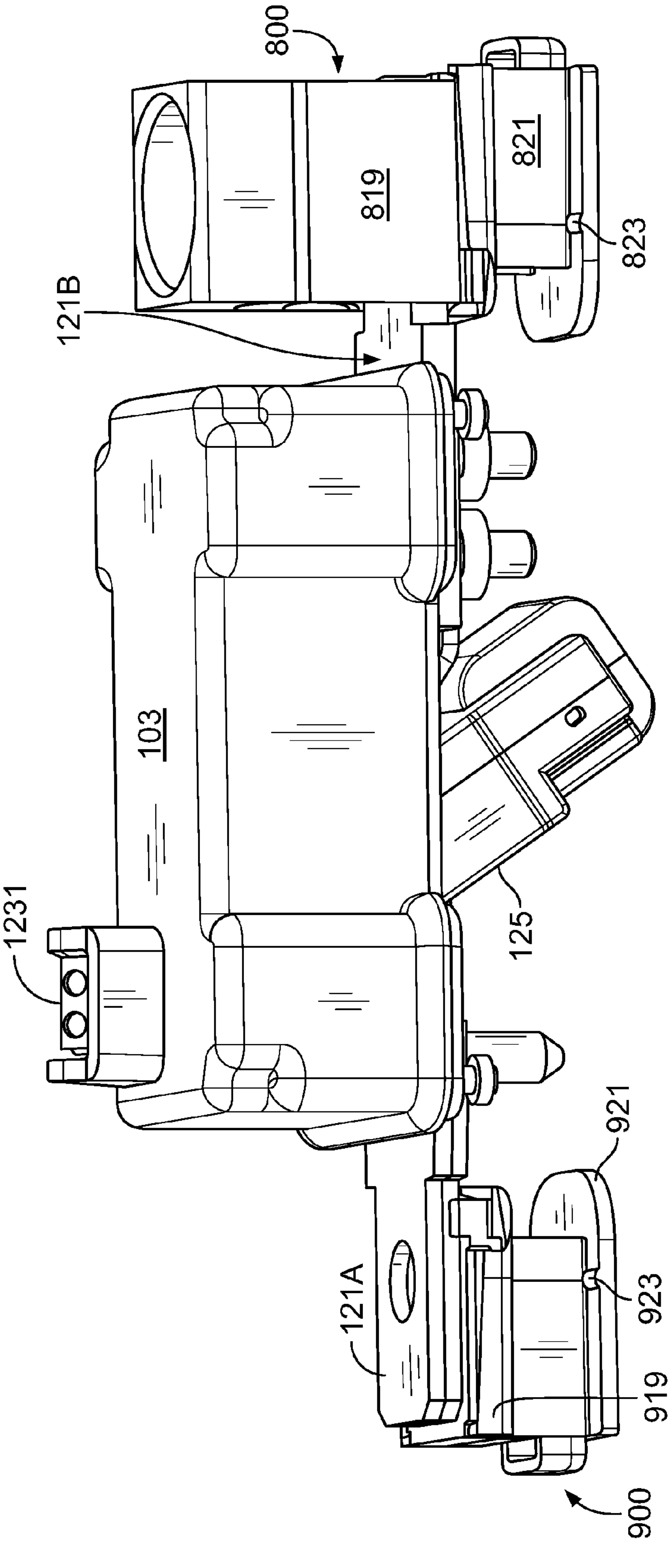
FIG. 12 is a perspective view of the ENCT shown in FIG. 1 with the base removed to reveal the raised detent features on a terminal nut assembly and a lug assembly that are secured to the jaws of the base of the ENCT.

A more detailed view of the base 110 is shown in FIG. 7A. In an embodiment the jaws 111A and 111B of the base 110 are provided with recessed detent features 702, 704 (see FIGS. 7A and 10) on a bottom surface of the jaws 111A, 111B, shown for example in region 1190 (FIG. 7B), that engage corresponding raised detent features, such as a raised detent feature 823, 923 (as shown in FIGS. 8, 9, and 12), of multiple different lug assemblies and terminal nut assemblies having different sizes to accommodate different amperage ratings. For example, a lug for a 250 A rating is larger than a lug suitable for a 150 A rating. One such lug assembly 800 is illustrated in FIG. 8. One such terminal nut assembly 900 is illustrated in FIG. 9. The lug assembly 800 and the terminal nut assembly 900 are shown assembled to the terminals 121A, 121B in FIG. 12, which has had the base 102 removed to reveal the raised detent features 823, 923. In the case of the lug assembly 800 of FIG. 8, a lug 819 (typically metal) is mated with a retainer 821 (typically plastic) having a raised detent feature 823. In the case of the terminal nut assembly 900 of FIG. 9, a terminal nut 919 (typically metal) is mated with a retainer 921 (typically plastic) having a raised detent feature 923. The raised detent features 723, 923 snap within the corresponding recessed detent features 702, such as found in the region 1190 of FIGS. 7A and 7B. Another recessed detent feature 704 is formed in the jaws 111A, 111B to accept a terminal nut assembly or a lug assembly of a different size, such as one for a different rating.

Although FIG. 11 illustrates a circuit breaker 1100 for use in conjunction with the ECNT 100 of FIG. 1, it should be understood that a corresponding circuit breaker is used in conjunction with the ECNTs 200, 300 shown in FIGS. 2 and 3 having a corresponding current sensor and a conductor entering the current sensor at the same angle as shown in the corresponding conductors in FIGS. 2 and 3. The circuit breaker 1100 is electrically coupled to and can be positioned a couple of feet away from the ENCT 100 within a breaker panel or switchgear, in an exemplary configuration.

FIG. 13 is an exemplary illustration of the ENCT 100 (or any of the other ENCTs described herein) electrically coupled to the circuit breaker 1100 (shown in FIG. 11) in a circuit that includes a load 1302 that is powered by a supply 1300. To connect the ENCT to the circuit, a conductor carrying load neutral current is inserted into a corresponding lug assembly or terminal nut assembly held between the jaw 111A of the ENCT 100, and another conductor carrying supply neutral current is inserted into a corresponding lug assembly or terminal nut assembly held between the jaw 111B of the ENCT 100.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A current transformer comprising:

a housing;

a first terminal having an end portion extending from and external to the housing;

a second terminal having an end portion extending from and external to the housing;

a conductor for carrying a current to be measured; and a current sensor having an aperture for receiving the conductor carrying the current to be measured, the aperture having a central axis, the conductor joining the first and second terminals to form a current path that passes through the aperture;

wherein a portion of the conductor passing through the aperture forms a substantial angle with respect to the central axis of the aperture, wherein the angle matches an angle formed by a conductor passing through a central axis of an aperture of a current sensor in a circuit breaker that receives a voltage output from the current transformer.

2. The apparatus of claim 1, wherein the conductor comprises a looped member that enters through a first side of the aperture, exits a second side, reverses direction outside of the aperture, passes back through the first side of the aperture, and exits out of the second side.

3. The apparatus of claim 2, wherein the current sensor comprises:

a closed-loop core defining said aperture; and a winding surrounding the closed-loop core.

4. The apparatus of claim 1, wherein the housing comprises jaw members for receiving and engaging a lug or terminal nut, the jaw members being configured to engage lugs or terminal nuts of multiple different sizes.

5. The apparatus of claim 1, wherein the current to be measured is a neutral current.

6. The apparatus of claim 1, wherein the angle is within a range of 20 to 45 degrees.

7. The apparatus of claim 1, wherein the housing comprises a base having a bottom surface, wherein the aperture of the current sensor is situated at a substantial angle in relation to a perpendicular to the bottom surface.

8. The apparatus of claim 7, wherein said angle is in the range of 20 to 45 degrees.

9. The apparatus of claim 1, wherein the housing includes a base having a jaw member, wherein a bottom surface of the jaw member includes a recessed detent feature for receiving therein a corresponding raised detent feature on a retainer of a lug or a terminal nut.

10. The current transformer of claim 1, wherein the conductor includes interlocking members, wherein the interlocking members resist rotation of the end portions of the first terminal and the second terminal when joined to the first terminal.

11. The apparatus of claim 10, wherein the interlocking members are formed integrally as part of the first and second terminals.

12. The apparatus of claim 11, wherein one of the terminals is provided with a groove and another of the terminals is provided with a corresponding tongue.

13. The apparatus of claim 12, wherein sidewalls of the tongue and of the groove are angled.

14. The apparatus of claim 13, wherein the housing comprises jaw members for receiving and engaging a lug or terminal nut, the jaw members being configured to engage lugs and terminal nuts of multiple different designs.

15. The apparatus of claim 10, wherein the current to be measured is a neutral current.

16. The current transformer of claim 1, wherein the conductor comprises a looped member that enters through an entrance of the aperture, reverses direction and exits out of the entrance of the aperture.

17. The apparatus of claim 16, wherein the housing comprises jaw members for receiving and engaging a lug or terminal nut, the jaw members being configured to engage lugs or terminal nuts of multiple different sizes.

* * * * *